United States Patent [19]

Bryer

[11] 4,426,669
[45] Jan. 17, 1984

[54] TRANSDUCER POSITIONER IN DISK FILES

[76] Inventor: Philip Bryer, 4271 Chaumont Rd., Woodland Hills, Calif. 91346

[21] Appl. No.: 227,416

[22] Filed: Jan. 22, 1981

[51] Int. Cl.$^3$ .............................................. G11B 5/55
[52] U.S. Cl. ................................................... 360/106
[58] Field of Search ................... 360/106, 103, 97, 98, 360/104, 105; 310/16

[56] References Cited

U.S. PATENT DOCUMENTS 3,056,962 10/1962 Johnson et al. ..................... 360/103
4,305,105 12/1981 Ho et al. .............................. 360/106

OTHER PUBLICATIONS

N. K. Frater, "Balanced Force Voice Coil Actuator", IBM Technical Disclosure Bulletin, vol. 15, No. 3, Aug. 1972.

Primary Examiner—Bernard Konick
Assistant Examiner—Kin Wong
Attorney, Agent, or Firm—Ralf H. Siegemund

[57] ABSTRACT

The transducer or transducers are mounted to the bottom of a U-frame carrying a coil between the legs; the coil is slipped onto and runs over a bar, facing two permanent magnets. One leg of the U-frame is suspended on leaf springs, being connected also to a base, so that the frame moves strictly linearly without lateral displacement. A similar spring mount may be connected to the other leg of the U-frame. The springs may have a U-configuration or an E-configuration.

17 Claims, 8 Drawing Figures

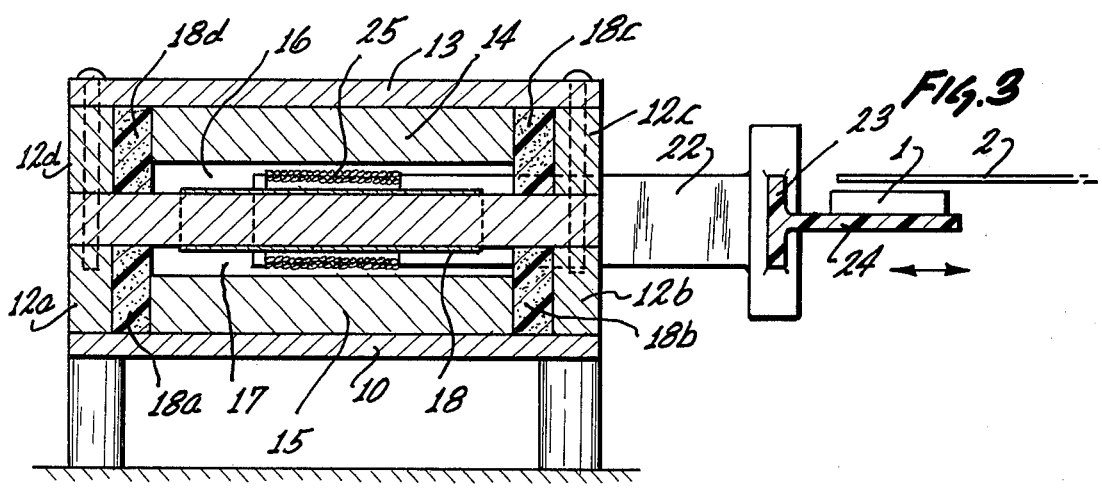
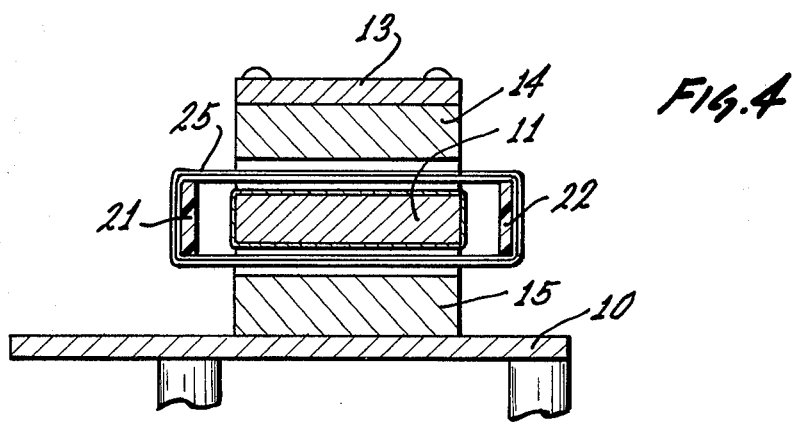
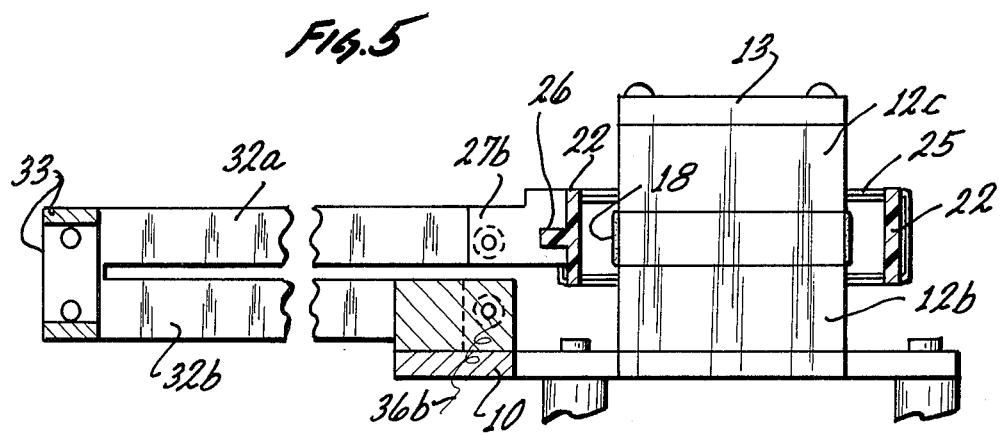

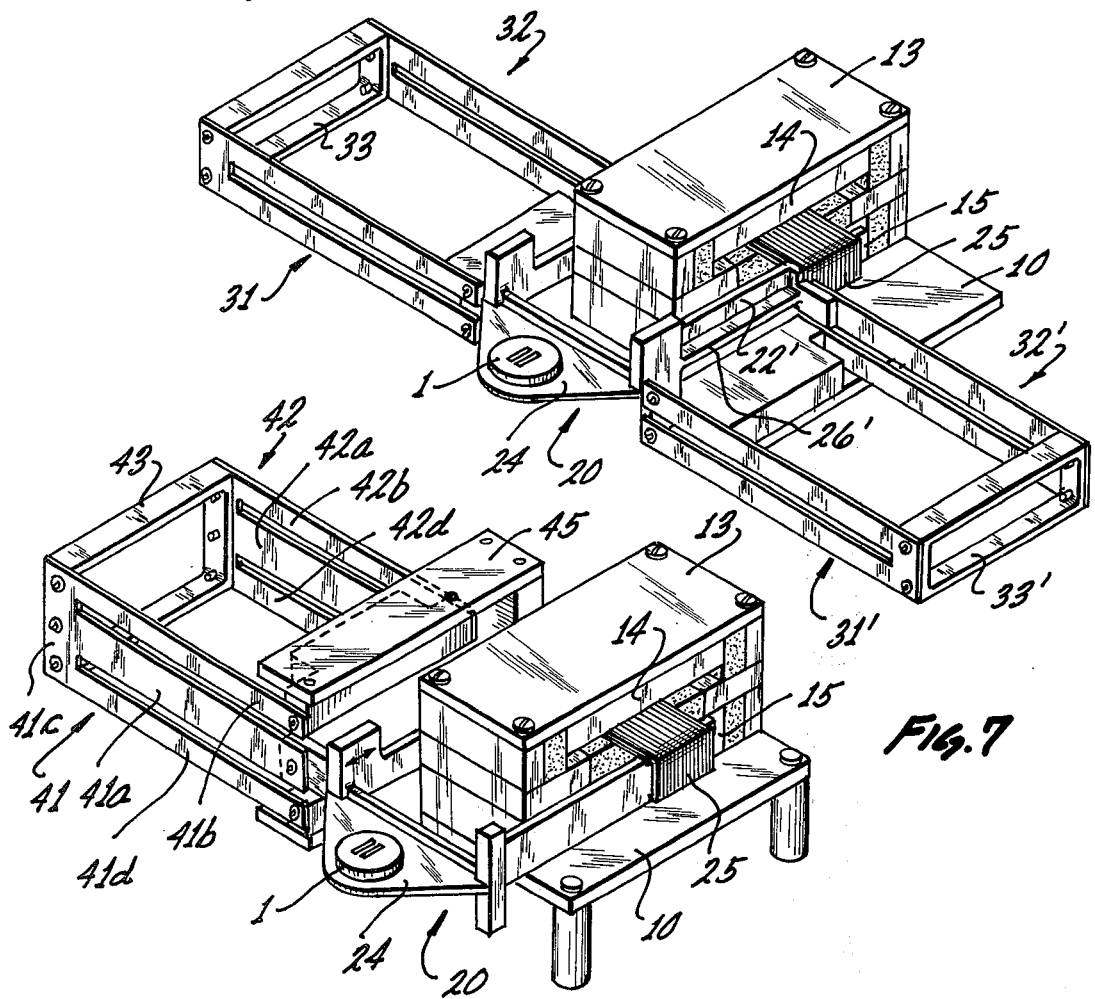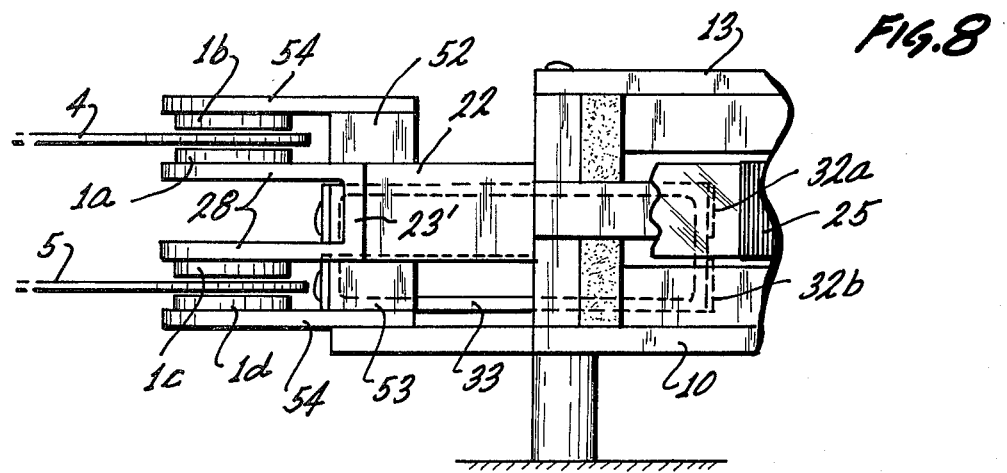

OPTICAL PLAYBACK APPARATUS FOCUSING SYSTEM FOR PRODUCING A PRESCRIBED ENERGY DISTRIBUTION ALONG AN AXIAL FOCAL ZONE

BACKGROUND OF THE INVENTION

This invention relates generally to optical playback apparatus and universal focusing systems, and more particularly to axicon-type focusing elements.

In the area of optical recording and playback apparatus, the accurate resolution of data on an optical data record has proven difficult to obtain. U.S. Pat. Nos. 3,501,586 and 4,090,031 to Russell and 4,142,209 to Hedlund, et al. disclose examples of such apparatus.

Typically, optical data is recorded along a track in the form of a very fine optical pattern, such as closely-spaced microscopic dots. This data is played back by scanning a light beam along the track to modulate the light beam in accordance with the optical pattern. The modulated beam is either transmitted or reflected to a light detector which produces an electrical output signal in accordance with the modulation of the beam. If all goes well, this signal faithfully reproduces the optical pattern to play back the originally recorded signal. However, numerous factors affect the ability to faithfully reproduce the recorded signal.

One important factor is the ability to focus the beam in the plane of the optical pattern and to maintain focus during playback. Prior playback systems employ a fixed or adjustable focal length focusing system including spherical or other point-focusing lenses. The focal point of the focusing system is positioned in the plane of the optical pattern by a variety of techniques. Examples of such techniques include moving either the optical elements or the record or both along the optical axis.

Initially, the optical elements and record are positioned manually. Because the optical pattern is typically very small and dense, positioning must be very precise. The problem is compounded by the need for accurate angular alignment of such elements. Thus, positioning the optical elements can be very difficult and time consuming.

Once the optical elements and record are initially positioned, focusing continues to be a problem during the operation of the playback system. The optical records are seldom truly planar. The mechanisms supporting and moving the records also have a certain amount of play in them. In the Hedlund, et al. apparatus of U.S. Pat. No. 4,142,209, the optical elements are shifted along the optical axis to scan different tracks. All of these factors can dynamically change the relative positions of the optical elements and record, causing the focal point to deviate from its ideal position. As a result, the image of data pattern tends to move in and out of focus causing errors during playback.

Accordingly, there is a need in optical playback systems for means for focusing the light beam on optical data patterns which obviates the need for highly precise positioning of the focusing elements and record. Such beam-focusing means should also be immune to dynamic variations in the relative position of its elements and the record in an optical playback apparatus.

In the field of optics, researchers have long sought a universal focus lens. In 1954, J. H. McLeod published a paper entitled "The Axicon: A New Type of Optical Element" in the *Journal of the Optical Society of America*, No. 44, pp. 592–597, indicating the discovery of such a lens. In his paper, McLeod defined the axicon and described several examples: a toric lens, a right conical lens and reflector, a hollow refractive sphere and a hollow reflective cylinder. McLeod also described possible uses for axicons in telescopes, microscopes, projectors and autocollimators.

Since 1954, further examples and applications of axicons have been identified. In an article entitled "Focons and Foclines as Concentrators of the Radiation of Extended Objects," *Soviet Journal of Optical Technology*, February 1977, pp. 66–69, V. K. Baranov describes two families of reflecting axicons—the parabolic-toroidal focon and the parabolic-cylindrical focline—and their ability to concentrate light from an extended source to a point. M. Rioux, et al. discussed the use of axicons in combination with lasers in an article entitled "Linear, Annular, and Radial Focusing with Axicons and Applications to Laser Machining," *Applied Optics*, Vol. 17, No. 10, pp. 1532–1536, May, 15, 1978.

Axicons have also been found to be applicable to forms of energy other than electromagnetic. Acoustical axicons and their applications are discussed in two articles by C. B. Burckhardt, et al. entitled "Ultrasound Axicon: A Device for Focusing Over a Large Depth," *Journal of the Acoustical Society of America*, No. 6, 1973, pp. 1628–30 and "Methods For Increasing The Lateral Resolution of B-Scan," *Acoustical Holography*, Vol 5, 1973, pp. 391–413, and in an article by H. D. Collins entitled "Acoustical Interferometry Using Electronically Simulated Variable Reference And Multiple Path Techniques," *Acoustical Holography*, Vol. 6, 1975, pp. 597–619.

Certain imaging characteristics of conical axicons are analyzed in an article entitled "Imaging Properties of a Conic Axicon," *Applied Optics*, August 1974, pp. 1762–1764 by W. R. Edmonds. In an article entitled "Focal Depth of a Transmitting Axicon," *Journal of the Optical Society of America*, April 1973, pp. 445–449, J. W. Y. Lit, et al. examined the axial field distribution of conical and curved conical axicons for plane uniform incident energy and for gaussian distribution incident energy. Lit, et al. noted that the focal zone intensity distribution would vary from point to point along the axis of a conical axicon.

However, none of the foregoing references deal with the problems of employing an axicon in an optical playback system. The references suggest that something approaching a universal focusing system can be made using an axicon. However, they do not recognize the problems that the variation of intensity of energy focused onto the axis of an axicon can create in an optical recording and playback system. For example, with a conical axicon, the variation in focal zone intensity can be great enough to completely mask the modulation of a light beam scanned across an optical record.

U.S. Pat. No. 4,133,600 to Russell, et al. uses a conical axicon lens to try to alleviate tolerance requirements in regard to positioning or flatness of the record. However, the axicon is used only for formation of holographic lens means, not during recording or playback of data.

Likewise, none of the references suggest an axicon focusing system or method of making axicons which will eliminate or control this intensity variation. Accordingly, there remains a need for a focusing system which will provide both nearly universal focusing and a controllable intensity distribution within a focal zone for playing back data on an optical record.

SUMMARY OF THE INVENTION

It is, therefore, an object of the invention to focus a beam of energy on an axial point regardless of changes in the position of such point along a finite length line.

A second object of the invention is to focus the beam with a specifiable intensity distribution along such line.

A third object is to focus the beam as aforesaid with a uniform intensity distribution along such line.

Another object of the invention is to focus energy as aforesaid from a beam having a gaussian radial intensity distribution.

A further object is to focus energy from a collimated beam, such as that produced by a laser, into an axial focal zone with a specifiable energy distribution along a portion of such zone.

A still further object of the invention is to provide a method for making an energy-focusing element, such as a lens or reflector, usable either alone or with other elements, to focus a beam of energy into an axial focal zone with a prescribed intensity distribution.

An additional object of the invention is to provide a focusing element having a refractive boundary operable to focus a beam of energy to a finite length line with a specifiable intensity distribution along such line.

Another object is to provide a family of focusing elements as aforesaid in which the refractive boundary is adjustable to accommodate incident energy beams having differing axially symmetrical intensity distributions to produce a specifiable focal zone intensity distribution.

A further object is to provide a method of making focusing elements having the foregoing characteristics.

A specific object of the invention is to provide for a family of axicon-like optical-focusing elements having a nonconical, aspherical refractive surface.

Another specific object is to provide for a family of axicon-like optical lenses having an aspherically curved surface and an opposite concave or convex surface.

A further specific object is to provide an optical playback system with means for focusing light on data in an optical record so as to produce a substantially uniformly modulated light beam regardless of errors in the relative position of the record and optical elements of the system along its optical axis.

To satisfy the foregoing objects, we have invented both a family of nonconical curved, axicon-type focusing elements and a method for making such elements. In the context of this invention, the terms "focusing element," and "axicon" are used interchangeably to refer to any kind of energy-focusing means. They include both reflective elements, or mirrors, and transmissive elements, or lenses. Such elements can have discrete boundaries or surfaces, or they can be formed of continuous focusing media. They can also include lens and reflectors for focusing acoustical energy such as ultrasonic waves, optical lenses and mirrors, and antennae for focusing microwaves.

One features of the invention is an axially symmetrical, nonconical focusing means configured to focus an axially symmetrical incident energy beam to a line, or axial focal zone, having a prescribed energy distribution between two different points. Another feature of the invention is a method of making such a focusing means.

Yet another feature is that the focusing means can be specified for an incident energy beam having a particular radial intensity distribution. This feature enables the lens to be matched to both the characteristics of the incident energy beam and the desired intensity distribution along the focal zone.

The foregoing and other objects, features and advantages of the invention will become more apparent from the following detailed description of a preferred embodiment of the invention, which proceeds with reference to the accompanying drawings.

BRIEF DESCRIPTION OF THE DRAWINGS

FIG. 3 is a line diagram of the convex surface of the lens of FIG. 2, the unbroken rays indicating refraction of the incident energy and the dashed rays indicating reflection of such energy when the surface is used as a concave mirror.

FIG. 4 is a front elevational view of the surface of FIG. 3.

FIGS. 5a, 5b and 5c are examples of incident energy intensity distributions from various sources, FIG. 5a showing a uniform distribution and FIGS. 5b and 5c showing truncated Gaussian distributions.

FIG. 6 is an enlarged vertical cross-sectional view of a portion of the scanner and record of FIG. 1 illustrating the focal zone produced by the lens of FIG. 2.

FIG. 7 is a preferred focal zone intensity distribution produced by a focal system in accordance with the invention.

FIG. 8 is another example of a prescribed focal zone intensity which a focusing system can be made to produce in accordance with the invention.

FIG. 9 is a vertical cross-sectional view of a double-convex lens according to the invention.

DESCRIPTION OF PREFERRED EMBODIMENT

Optical Playback Apparatus

Figure 1:
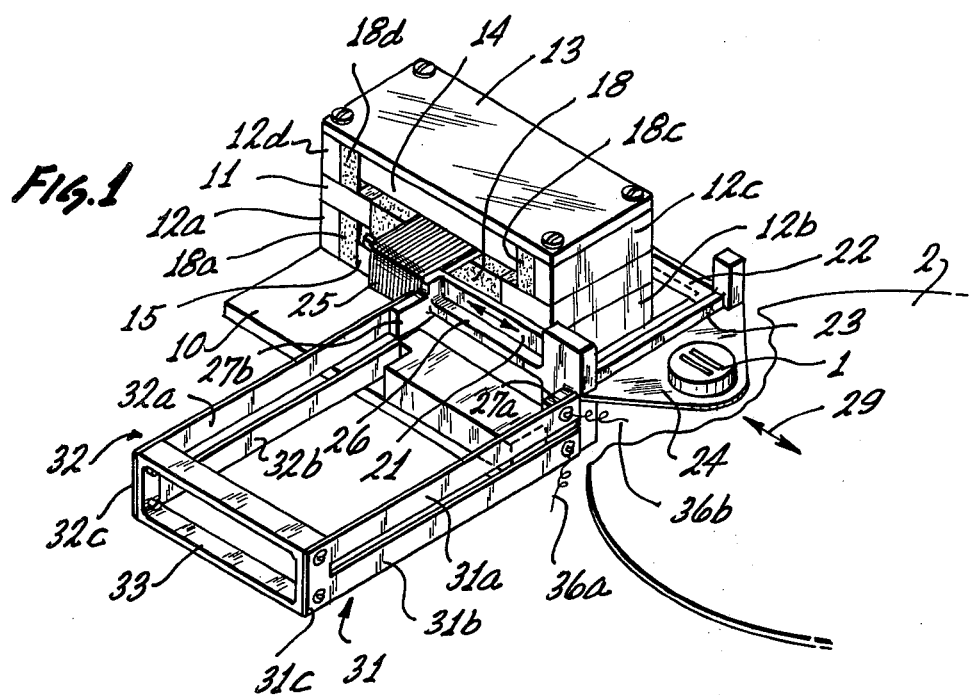
FIG. 1 is a schematic diagram of one embodiment of an optical playback apparatus for a reflective-type optical data record, incorporating a focusing system according to the present invention.
Figure 2:
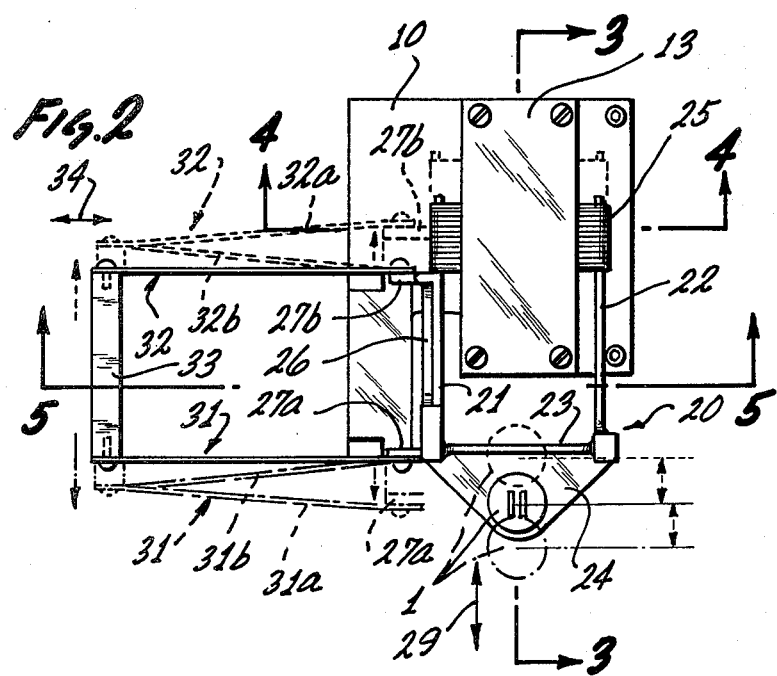
FIG. 2 is an enlarged, vertical cross-sectional view of a concave-convex axicon lens such as that of FIG. 1 showing the focusing of incident energy from a point source to a focal zone.

Referring to FIG. 1, an optical playback apparatus for playing back data recorded on an optical record 10 comprises a light source 12, a light detector means 14, a focusing means 16 for focusing light emitted from the light source, and scanning means 18 for scanning the focused beam across record 10.

The light source 12 is preferably a laser which produces coherent light in a narrow frequency band. However, any essentially point source of light can be used which produces an axially symmetrical light beam 20.

Beam 20 is directed toward focusing means 16. The focusing means preferably includes a primary point-focusing lens 22, an apertured light mask, commonly referred to as a "pinhole" element 24, and a "tipping" plate 26. The foregoing elements are aligned along the optical axis of beam 20. Lens 22 focuses beam 20 through the pinhole of element 24 to shape the light spot for imaging onto the optical record 10. The tipping plate is positioned in the path of the shaped light beam to laterally displace the light beam through small angles by refraction. The tipping plate is pivoted by a galvanometer-type motor 28 in response to a tracking signal applied to its input 30 to cause the light beam to stay on arms. In other words, the two constructions as per FIGS. 6 and 7 can be combined by duplicating the structure 41, 42, and 43 at the other arm of the U-shaped frame.

The transducers and their mount have been shown in a somewhat simplified fashion in order to concentrate on the mounting structure of the transducer carriage and positioner proper. FIG. 8 illustrates the preferred structure in which, in fact, four transducers 1a, 1b, 1c, and 1d are positioned with respect to two disks 4 and 5. The bottom 23' of the U-shaped frame has, in transverse view, itself a U-shaped configuration on account of two mounting platforms 28 (replacing the single platform 24) for transducers 1a and 1c. Posts 52 and 53 carry additional holding platforms 54 and 55 for the transducers 1b and 1d.

The invention is not limited to the embodiments described above; but all changes and modifications thereof, not constituting departures from the spirit and scope of the invention, are intended to be included.

I claim:

1. A linear actuator for positioning at least one transducer in one of a plurality of positions and for moving the transducer from one of the positions to another one thereof, comprising:
   mounting base means;
   a flat, bar-shaped, magnetizable core;
   magnet means for inducing a homogeneous, magnetic field across the bar, there being gaps between the magnet means and opposite, flat sides of the bar, the magnet further including magnetic return path means coupled to the flat bar at opposite ends;
   a coil looping around the flat bar and extending through the gaps for being movably disposed;
   frame means of U-shaped configuration, having legs and a transverse base, the coil being fixedly mounted on and between the legs, the transducer being mounted on the base of the frame means;
   a pair of flat spring means, each of the flat spring means of the pair having a first leg and a second leg, and an integral juncture at one end of each one of the respective first and second leg, each leg of the spring means having a free end, the free ends of the first legs of the spring means of the pair being secured to one of the legs of the U-shaped frame means, one first leg of one of the spring means being secured in a first point of the frame means near said base of the frame means, the first leg of the other spring means being secured to a second point on the one leg of the U-shaped frame and means spaced from the first point;
   a rectangular frame for interconnecting the junctures of the two spring means; and
   the second legs of the pair of flat spring means having their respective free ends secured to the mounting base means at points in respective alignment with said points in said one leg of the U-shaped frame means.

2. An actuator as in claim 1, the one leg of the U-shaped frame means to which said first leg of of the other spring means is secured, being provided with a stiffening ridge.

3. An actuator as in claim 1, said rectangular frame being hollow.

4. An actuator as in claim 1, said junctures being spaced by the rectangular frame by a spacing equal to the spacing between said points on the one of the U-shaped frame means.

5. An actuator as in claim 2, said other leg of the U-shaped frame means being relatively flexible.

6. An actuator as in claim 1, including a further pair of flat spring means configured as said first-mentioned spring means, there being also a further rectangular frame connected to said further pair as said first-mentioned rectangular frame is to said first-mentioned spring means, one free end of each of the further pair being connected to the other leg of the U-shaped frame, other free ends of the further pair being connected to the base.

7. An actuator as in claim 1, each of said spring means having a third leg, the respective free end of the third leg being connected to one of the mounting base means and of the U-shaped frame means, those of the legs of each of the spring means flexing similarly upon displacement of the coil, being half as wide as the remaining one.

8. An actuator as in claim 1, the magnet means including two permanent magnets, facing said flat bar across said gaps.

9. An actuator as in claim 1 or 8, including nonmagnetic stop means in said gaps for limiting the coil displacement.

10. An actuator as in claim 1, said spring means as mounted being electrically insulated from each other, the coil being electrically connected to the first legs, the second legs provided for current feed in.

11. A linear actuator, comprising:
    a core structure on a base;
    a coil magnetically cooperating with the core structure to be linearly displaced;
    frame means of U-shaped configuration, having legs and a transverse base, the coil being mounted on and between the legs, the transducer being mounted on the base;
    a pair of flat spring means, each of the flat spring means having a first leg and a second leg and an integral juncture at one end of each one of the respective first and second legs, each leg of the spring means having a free end, the free ends of the first legs of the spring means of the pair being secured to one of the legs of the U-shaped frame means, one first leg of one of the spring means being secured in a point near said base, the first leg of the other spring means being secured to a point on the one leg of the U-shaped frame means spaced therefrom;
    a rectangular frame for interconnecting the junctures of the two spring means; and
    the second legs having their free ends secured to the base means at points in respective alignment with said points in said one U-shaped frame means leg.

12. A positioner and actuator for at least one transducer, comprising:
    a mounting base;
    a U-shaped frame having a bottom traverse and two legs, the transducer being mounted to said bottom;
    a coil mounted on the two legs;
    core means magnetically cooperating with the coil for displacing the coil along a particular path; and
    spring means including two U-shaped leaf springs, having their bottoms interconnected by a laterally displaced element, one leg of each U-shaped leaf spring being connected to one leg of the frame, the respective other leg of each leaf spring being connected respectively to the mounting base of the frame so that, upon displacement of the U-shaped frame, the element is displaced by half of that displacement.

13. A positioner and actuator for at least one transducer, comprising:
   a mounting base;
   a U-shaped frame having a bottom traverse and two legs, the transducer being mounted to said bottom;
   a coil mounted on the two legs;
   core means magnetically cooperating with the coil for displacing the coil along a particular path; and
   spring means including two E-shaped leaf springs, each one having two outer legs connected to the mounting base and one leg of the U-shaped frames, a third, middle one of the legs of each spring being connected to the other one of the mounting base and the said one leg of the U-shaped frame, each middle leg of the two "E's" being twice as wide as the respective outer legs, common elements of each spring being interconnected by said laterally displaced element.

14. A positioner as in claim 12 or 13, the element being a hollow rectangular frame.

15. A linear actuator for positioning at least one transducer in one of a plurality of positions and for moving the transducer from one of the positions to another one thereof, comprising:
   mounting base means;
   a flat, bar-shaped, magnetizable core;
   magnet means for inducing a homogeneous, magnetic field across the bar, there being gaps between the magnet means and opposite, flat sides of the bar, the magnet means further including magnetic return path means coupled to the flat bar at opposite ends;
   a coil looping around the flat bar and extending through the gaps for being movably disposed;
   U-shaped frame means having legs, said coil being mounted to said legs, and having a bottom traverse, said transducers being mounted to said traverse, said magnetic return path means configured to magnetically shield said transducers from said gaps;
   a pair of flat spring means, each of the flat spring means having a first leg and a second leg, and an integral juncture at one end of each of the respective first and second leg, each leg of the spring means having a free end, the free ends of the first legs of the spring means of the pair being secured to one of the legs if the U-shaped frame means, one first leg of one of the spring means being secured to the frame means in a first point near said base of the frame means, the first leg of the other spring means being secured to a second point on the one leg of the U-shaped frame means and from the spaced second point;
   a rectangular frame for interconnecting the junctures of the two spring means; and
   the second legs of the pair of flat spring means having their free ends secured to the mounting base means at points in respective alignment with said first and second points in said one leg of the U-shaped frame means.

16. A linear actuator for positioning at least one transducer in relation to a spring magnetic disk, comprising:
   a core structure on a mounting base means;
   a coil magnetically cooperating with the core structure to be linearly displaced;
   frame means of U-shaped configuration, having legs and a traverse base, the coil being fixedly mounted on and between the legs, the transducer being mounted on the transverse base of the frame means;
   a pair of flat spring means, each of the flat spring means having a first leg and a second leg, and an integral juncture at one end of each of the respective first and second leg, each leg of the spring means having a free end, the free ends of the first legs of the spring means of the pair being secured to one of the legs of the U-shaped frame means, one first leg of one of the spring means being secured in a first point of the frame means near said base of the frame means, the first leg of the other spring means being secured to a second point on the one leg of the U-shaped frame means spaced therefrom;
   a rectangular frame for interconnecting the junctures of the two spring means; and
   the second legs having their free ends secured to the mounting base means at points in respective alignment with said points in said one leg of the U-shaped frame means.

17. A linear actuator as in claim 11 or 16, said core structure comprising:
   a flat, bar-shaped, magnetizable core; and
   magnet means for inducing a homogenic, magnetic field across the bar, there being gaps between the magnet means and opposite, flat sides of the bar, the magnet means further including magnetic return path means coupled to the flat bar at opposite ends.

* * * * *